United States Patent
West et al.

(10) Patent No.: US 8,884,456 B2
(45) Date of Patent: *Nov. 11, 2014

(54) TURBINE UNIT AND ASSEMBLY

(75) Inventors: Stephen Mark West, Singapore (SG); Steele West, Singapore (SG)

(73) Assignee: Braddell Limited, Douglas (IM)

( * ) Notice: Subject to any disclaimer, the term of this patent is extended or adjusted under 35 U.S.C. 154(b) by 1108 days.

This patent is subject to a terminal disclaimer.

(21) Appl. No.: 12/445,456

(22) PCT Filed: Oct. 5, 2007

(86) PCT No.: PCT/AU2007/001510
§ 371 (c)(1), (2), (4) Date: Nov. 25, 2009

(87) PCT Pub. No.: WO2008/043131
PCT Pub. Date: Apr. 17, 2008

(65) Prior Publication Data
US 2010/0102566 A1    Apr. 29, 2010

(30) Foreign Application Priority Data

Oct. 13, 2006   (AU) ................................ 2006905675
Mar. 16, 2007   (AU) ................................ 2007901399
Jul. 23, 2007    (AU) ................................ 2007903965
Aug. 3, 2007    (AU) ................................ 2007904173
Aug. 3, 2007    (AU) ................................ 2007904176

(51) Int. Cl.
*F03B 13/00*   (2006.01)
*F03B 13/10*   (2006.01)
*F03D 1/02*    (2006.01)
*F03D 1/04*    (2006.01)

(52) U.S. Cl.
CPC .................. *F03B 13/10* (2013.01); *Y02E 10/22* (2013.01); *F05B 2240/133* (2013.01); *F05B 2240/97* (2013.01); *Y02E 10/72* (2013.01); *F03D 1/025* (2013.01); *F03B 13/105* (2013.01); *F03D 1/04* (2013.01)
USPC ............................................... 290/54; 290/55

(58) Field of Classification Search
USPC ............................. 290/42, 43, 44, 53, 54, 55
See application file for complete search history.

(56) References Cited

U.S. PATENT DOCUMENTS 1,491,688 A     4/1924   Ford
4,102,599 A     7/1978   Ziegler (Continued)

FOREIGN PATENT DOCUMENTS

CA    2301388 A1 *  9/2001   .............. F03B 13/00
CH    158 916       12/1932

(Continued)

OTHER PUBLICATIONS

Office Action dated Jun. 18, 2012 in U.S. Appl. No. 12/681,363.

(Continued)

*Primary Examiner* — Tulsidas C Patel
*Assistant Examiner* — Viet Nguyen
(74) *Attorney, Agent, or Firm* — Knobbe Martens Olson & Bear LLP

(57) ABSTRACT

A turbine unit (11) adapted to be placed in a flowing fluid. The turbine unit (11) comprises a first turbine set (13) and a second turbine set (15) mounted within a passage (21) of a housing (19). The first turbine blade set (13) and a second turbine blade set (15) are set in opposed relation such that in operation a region between the two turbine blade sets (13, 15) has a lower pressure than the fluid pressure at an opening of the passage (21). The turbine unit (11) being used to generate power. The turbine units (FIGS. 8 to 11) can be abutted with each other such that they define a passage and each turbine unit comprises a driving turbine blade set before fluid passes to a pumping turbine blade set.

33 Claims, 10 Drawing Sheets

(56) References Cited

U.S. PATENT DOCUMENTS

| | | | |
|---|---|---|---|
| 4,120,602 A | | 10/1978 | Megnint |
| 4,424,452 A | | 1/1984 | Francis |
| 4,468,153 A | | 8/1984 | Atencio |
| 4,531,888 A | * | 7/1985 | Buchelt .................. 415/148 |
| 4,720,640 A | | 1/1988 | Anderson et al. |
| 5,040,945 A | * | 8/1991 | Levesque .................. 415/124.1 |
| 5,383,768 A | | 1/1995 | Siga et al. |
| 6,009,822 A | * | 1/2000 | Aron .................. 114/151 |
| 6,126,385 A | * | 10/2000 | Lamont .................. 415/4.5 |
| 6,835,043 B2 | | 12/2004 | Milan et al. |
| 6,856,042 B1 | * | 2/2005 | Kubota .................. 290/55 |
| 7,116,005 B2 | | 10/2006 | Corcoran |
| 7,285,871 B2 | | 10/2007 | Derouineau |
| 7,745,950 B2 | * | 6/2010 | Lueck .................. 290/52 |
| 8,358,023 B2 | * | 1/2013 | West .................. 290/43 |
| 2001/0004439 A1 | * | 6/2001 | Bolcich et al. .................. 416/9 |
| 2003/0193198 A1 | | 10/2003 | Wobben |
| 2005/0123390 A1 | * | 6/2005 | Lamont .................. 415/4.1 |
| 2007/0176431 A1 | * | 8/2007 | Graham, Sr. .................. 290/55 |
| 2008/0093861 A1 | * | 4/2008 | Friesth et al. .................. 290/55 |
| 2010/0007148 A1 | * | 1/2010 | Davis et al. .................. 290/54 |
| 2010/0102566 A1 | | 4/2010 | West et al. |
| 2010/0237620 A1 | | 9/2010 | West |

FOREIGN PATENT DOCUMENTS

| | | | |
|---|---|---|---|
| DE | 33 39 462 | 5/1984 | |
| DE | 3823587 A1 | 1/1990 | |
| EP | 1655457 A1 | 5/2006 | |
| FR | 2445451 | 1/1978 | |
| FR | 2610672 A1 | 8/1988 | |
| NL | 7905389 | 1/1980 | |
| RU | 2256081 C1 | 7/2005 | |
| WO | WO 00/23708 | 4/2000 | |
| WO | WO 0023708 A1 * | 4/2000 | ............. F03B 13/10 |
| WO | WO 00/71890 | 11/2000 | |
| WO | WO 02/061273 | 8/2002 | |
| WO | WO 2004/031577 A2 | 4/2004 | |
| WO | WO 2004/113717 A1 | 12/2004 | |
| WO | WO 2006/054290 | 5/2006 | |
| WO | WO 2008/016584 | 2/2008 | |

OTHER PUBLICATIONS

International Search Report and Written Opinion from PCT/AU2008/001493 dated Dec. 12, 2008.

Extended European Search Report dated Aug. 1, 2013 for European Application No. 07 81 5316.0.

* cited by examiner

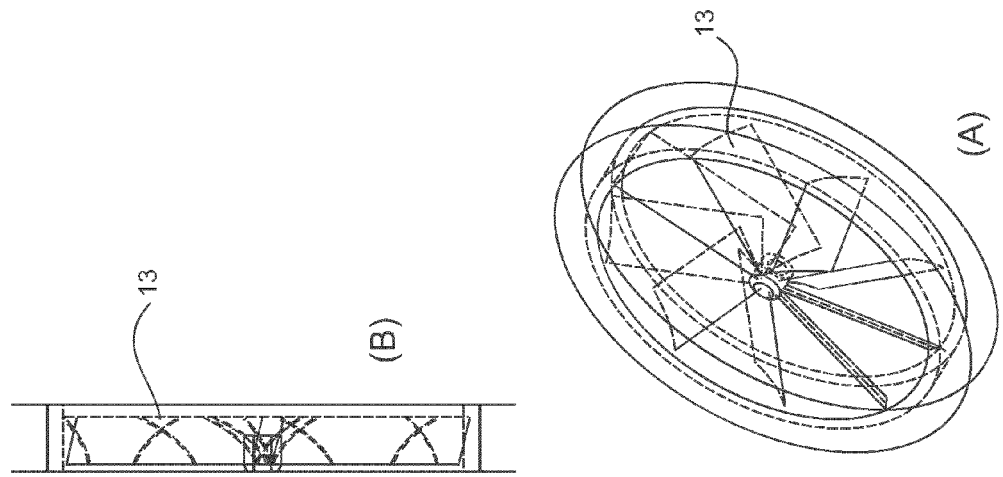
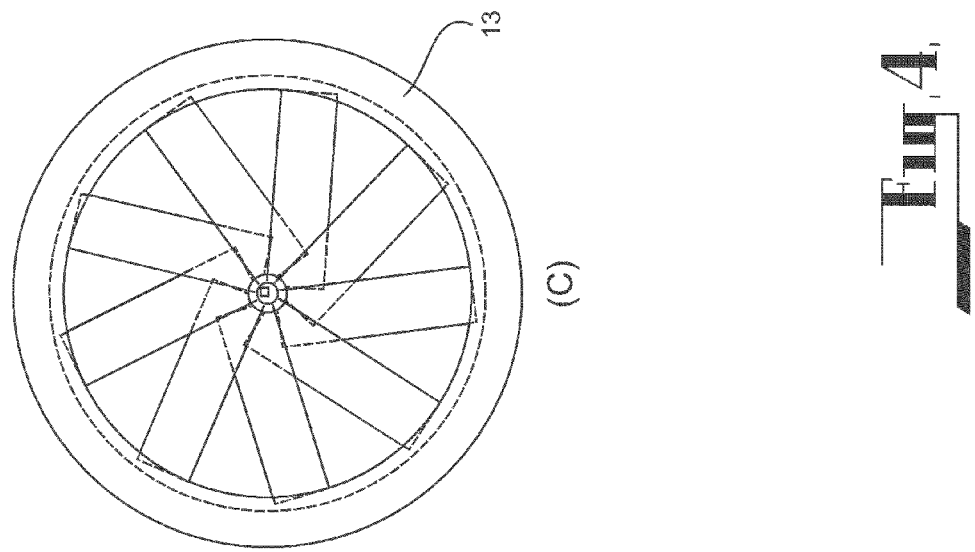
Fig. 4

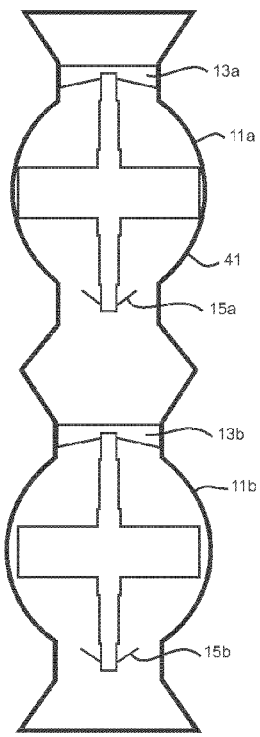
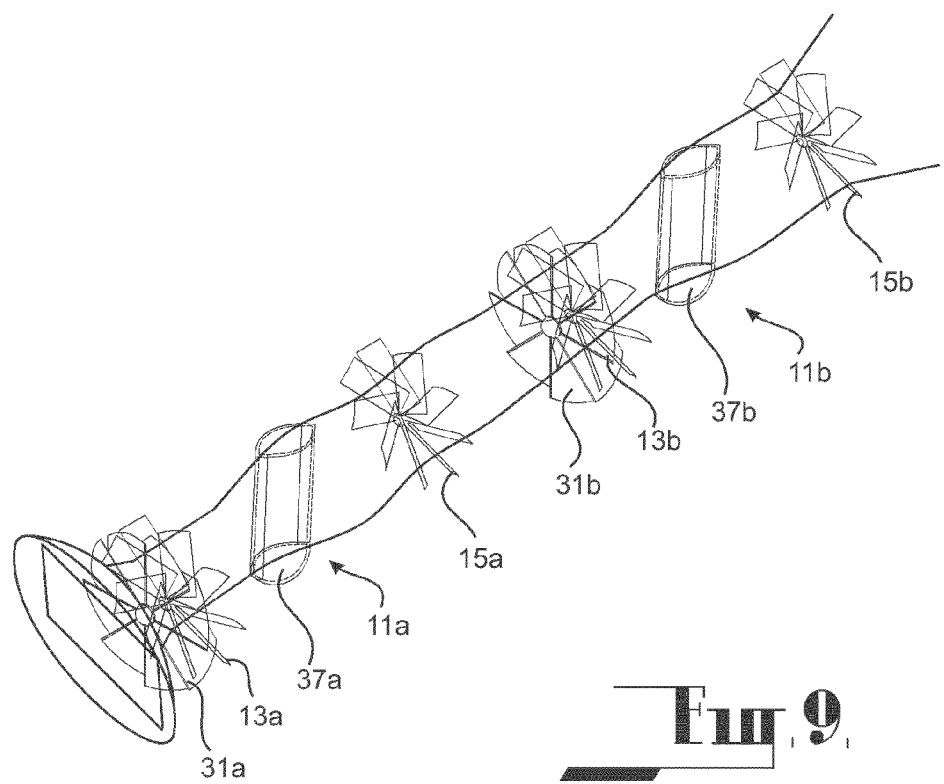

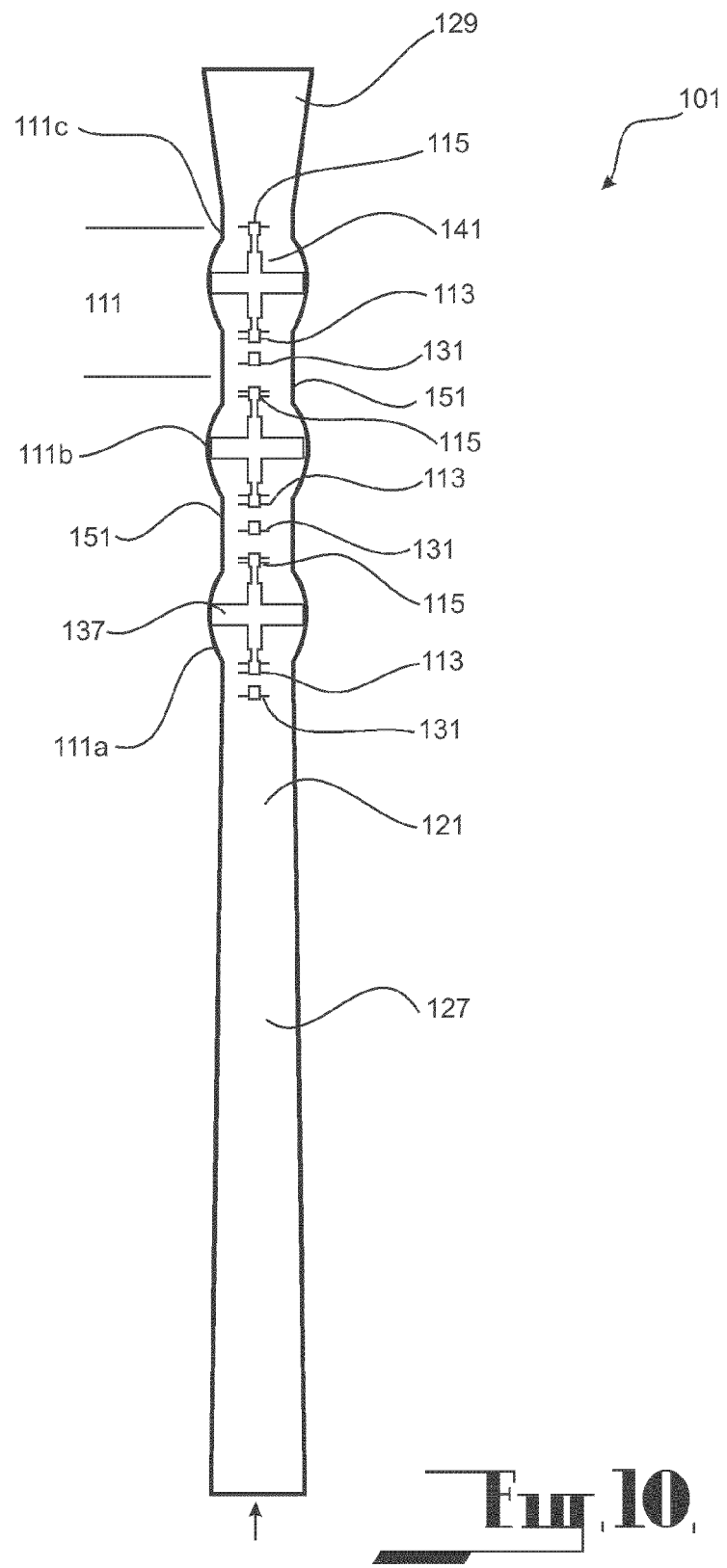

TURBINE UNIT AND ASSEMBLY

FIELD OF THE INVENTION

The present invention generally relates to a turbine assembly. In particular the invention relates to a turbine assembly powered by a flowing fluid.

BACKGROUND ART

As the demand on earths diminishing fossil fuels increases, research and development of alternative sources of energy is rapidly expanding. To date nuclear energy and renewable energy sources are dominant when considering alternative energy sources.

In relation to nuclear energy there are many significant disadvantages in the use of this fuel: waste disposal/storage, establishment costs and risk of accident, to name but a few.

In relation to renewable energy, such as wind, solar, and wave energy, the cost associated with the establishment of a sufficiently sized plant to harness the energy is, to date, a relatively expensive alternative. Furthermore, the plant only generates energy from these sources if these sources are present. As this is not always the case, the plant may lay idle, unable to produce any energy until the wind blows, the sun is present or the swell improves. As a result, these sources are only used to supplement energy supplied through conventional means.

Another problem with renewable energy alternatives is that the plant required to harness the energy is often unsightly and requires a large area of land or fluid body area.

The preceding discussion of the background to the invention is intended only to facilitate an understanding of the present invention. It should be appreciated that the discussion is not an acknowledgment or admission that any of the material referred to was part of the common general knowledge as at the priority date of the application.

It is an object of this invention to provide a turbine assembly which ameliorates or overcomes one or more of the disadvantages of the prior art or which provides a useful alternative.

DISCLOSURE OF THE INVENTION

The present invention provides a turbine unit adapted to be placed in a flowing fluid, the turbine unit comprises a first turbine blade set and a second turbine blade set mounted within a passage of a housing, the first turbine blade set and second turbine blade set being in opposed relation such that in operation a region between the two turbine blade sets has a lower pressure than the fluid pressure at an opening of the passage, wherein the turbine unit is used to generate power.

Preferably the first turbine blade set and second blade set are in spaced apart relation.

Preferably the first turbine blade set and second blade set are positioned in opposed direction to each other. That is to say the blades are reversed relative to each other.

Each blade set may be connected to a generator such that movement of each blade set is transformed into energy.

As the fluid flows through the passage, the flow drives the first turbine blade set which starts the rotation of the second turbine blade set. As the second turbine blade set rotates it effectively pulls the fluid toward it, creating a lower pressure region between the two turbine blade sets. The same occurs when the flow of fluid is reversed, that is the fluid engages the second turbine blade set before the first turbine blade set.

The current invention is to be located in the path of a flowing fluid such that the fluid causes the turbine blade sets to rotate. In contrast to the prior art, the present invention produces energy regardless of the direction of fluid flow.

Preferably the first turbine blade set and second turbine blade set are positioned such that when fluid flows through the first blade set, the first blade set rotates, and the second blade set is induced to rotate, as the second blade set rotates the fluid is pulled through the system to be pushed out the unit, minimizing the back flow pressure and energy loss. This is also the case in the reverse flow whereby the first turbine blade set acts to pull the fluid there towards. The act of pushing the fluid out of the passage also overcomes the pressure head which exists at the exit of the passage.

Furthermore, owing to the orientation of each turbine blade sets with respect to each other, the effect of the second turbine blade set also minimises turbulence within the system, having the effect of straightening the fluid flow as it passes from the first turbine blade set.

Preferably the first turbine blade set and second turbine blade set are coaxially mounted. The first turbine blade set and second turbine blade set may be mounted on a shaft (i.e. the same shaft).

In another aspect of the invention the axis of rotation of the first turbine blade set is offset to the axis of rotation of the second turbine blade set. In this arrangement the first turbine blade set and second turbine blade set may be interconnected via a gear system.

Preferably the first turbine blade set and second turbine blade set are configured to provide maximum torque.

Preferably the turbine unit comprises a gearbox interconnected with the first turbine blade set and second turbine blade set. The gearbox may be interconnected to each turbine blade set.

Preferably the generator is secured to the housing.

Preferably the gearbox is secured with respect to the housing. The gearbox may be located in the passage.

In one aspect of the invention the generator forms part of the housing.

In another aspect of the invention the generator is located external to the housing.

The generator may be connected to a plurality of turbine units.

A plurality of generators may be connected to the turbine unit.

Preferably the gear box is connected to the shaft, which in turn is coupled to the generator such that movement of each turbine blade set is transformed by the generator into energy via the gear box.

The passage may comprise a chamber located between the first turbine blade set and second turbine blade set. The chamber may extend outwardly from the first turbine blade set before converging as it approaches the second turbine blade set.

The passage may comprise a first nozzle located between a first end of the passage and the first turbine blade set. The passage may also comprise a second nozzle located between the second turbine blade set and a second end of the passage.

Each nozzle is configured to converge in a direction towards the chamber of the turbine unit. That is to say the larger opening of the nozzle is further away from the respective turbine blade set than the smaller opening of the nozzle.

In one flow direction the respective nozzle acts as a converging nozzle to increase the velocity of the fluid flow as the fluid moves towards the turbine blade set, whilst in the other direction the respective nozzle acts as a diverging nozzle to decrease the velocity of the fluid flow as the fluid moves away from the turbine blade set.

Preferably when the respective nozzle acts as a diverging nozzle it contributes to reducing the back pressure created by the fluid flow energy losses of the turbine blade set as the fluid moves away from the turbine blade set.

The first nozzle and the section of the chamber adjacent the first nozzle may define a first venturi. The second nozzle and the section of the chamber adjacent the second nozzle may define a second venturi.

The exterior shape of the gearbox and/or generator may be streamlined so as to have minimal impact on the fluid flow.

The exterior shape of the gearbox may be designed to reduce energy loss in the passage between the first turbine blade set and second turbine blade set. Preferably the gearbox is positioned and the chamber is configured to enhance the venturi effect through the chamber.

The exterior shape of the gearbox may have the effect of straightening the fluid flow as it passes from the first turbine blade set.

The turbine unit may comprise a first stator set for directing fluid. The first stator set may be located between the first nozzle and first turbine blade set, whereby the first stator set directs fluid onto the blades of the first turbine blade set.

The turbine unit may comprise a second stator set for directing fluid. The second stator set may be located between the second nozzle and second turbine blade set, whereby the second stator set directs fluid on to the blades of the second turbine blade set when the flow is reversed.

The turbine unit may comprise a third stator set for directing fluid. The third stator set may be located between the first turbine blade set and second turbine blade set, whereby the third stator set directs fluid on to the blades of the second turbine blade set as the flow passes from the first blade set.

The turbine unit may comprise a fourth stator set for directing fluid. The fourth stator set may be located between the first turbine blade set and second turbine blade set, whereby the fourth stator set directs fluid on to the blades of the first turbine blade set as the flow passes from the second blade set, as would be the case when the flow is reversed.

Preferably the first stator set, second stator set, third stator set and/or fourth stator set are coaxially mounted on the shaft.

Preferably the first stator set, second stator set, third stator set and/or fourth stator set are variably positioned such that the plane in which the stator set lies can be angled with respect to the shaft.

Preferably the blades of the first stator set, second stator set, third stator set and/or fourth stator set are variably adjusted so that the fluid flow can be directed towards the blades of the respective turbine blade set to maximise movement of the turbine blade set.

Each stator set may be adjusted to a position in which fluid passes therethrough without substantially moving the stator set.

The blades of each turbine blade set may be adjusted. The blades may be adjusted to a position in which fluid passes therethrough without substantially moving the turbine blade set.

The turbine unit may comprise a control system to initially start the unit so as to overcome the unit's inertia. The control system may also adjust the first stator set, second stator set, third stator set and/or fourth stator set as required.

The control system may also comprise a switching mechanism to allow the direction of the turbine blade sets to reverse direction without altering the operation of the generator. The change in direction of rotation of the blade sets will occur when the fluid flow reverses.

The turbine unit may further comprise screens at the first end and second end of the passage to prevent debris and animals entering the passage.

The present invention further provides a plurality of turbine units as herein before described wherein the units are arranged in an array. The units may be stacked one on top of the other. The units may be positioned in spaced apart relation on an ocean bed, riverbed or attached to a structure, such as an oil rig or the hull of a ship. The units may be positioned in a series. The units may be placed in an abutting arrangement such that fluid exiting a turbine unit passes immediately into another adjacent turbine unit.

The turbine unit or multiples thereof may be placed in alignment with the hydro slot of a hydroelectric dam, may be placed in a pipeline, may be located in river weir wails and/or in tidal barrages such that energy generation can be maximised from the in and outgoing tides whereby the period of tidal slack has minimal impact on energy generation. Typically when the tide changes there is a period in which the flow is reduced significantly. To negate this period of relatively little flow a tidal barrage is used to regulate flow and allow fluid to be provided at a greater flow during the period of tidal change. Other applications include dams, water supply lines, water treatment plants, in fact anywhere where there is a fluid flowing.

The invention may also be placed in a flowing gas. This includes being positioned in a plane, train or other vehicle in which the vehicle passes through the gas.

The present invention may be used to pump any fluid including air, slurries and brine.

For each unit configured to have a leading turbine blade set (first or second turbine blade set depending on the flow direction) and trailing turbine blade set (second or first turbine blade set depending on the flow direction), the energy loss created by the leading turbine blade set is compensated by the action of the trailing turbine blade set. As the system can be designed so that there is negligible net negative effect, placing a unit in a fluid flow path has negligible effects on the flow, allowing the unit to be placed in a pipeline without substantially affecting the flow through the pipeline.

The present invention provides a turbine unit adapted to be placed in a flowing fluid, the turbine unit comprises a first turbine blade set and a second turbine blade set mounted within a passage in a housing, the first turbine blade set and second turbine blade set being in opposed spaced apart relation such that fluid moving in a first direction will first move the first turbine blade set and fluid moving in a second direction will first move the second turbine blade set, wherein each blade set is connected to a generator such that movement of each blade set is transformed into electrical energy, whereby the blade set which trails the other blade set creates a relatively low pressure region within the unit, wherein the turbine unit generates power.

Preferably the first turbine blade set and second blade set are positioned in opposed direction to each other. That is to say the blades are reversed relative to each other.

Preferably the first turbine blade set and second turbine blade set are mounted on a common shaft.

The present invention provides a turbine unit adapted to be placed in a flowing fluid, the turbine unit comprises a turbine blade set mounted in a passage within a housing, a stator set for directing the fluid onto the blades of the turbine blade set, a trailing diverging nozzle incorporated in the passage and positioned such that the fluid first passes through the turbine blade set, and a leading converging nozzle incorporated in the passage positioned such that the fluid passes therethrough and onto the turbine blade set, whereby the trailing diverging nozzle creates a region in the passage of lower pressure, relative to the pressure of the fluid entering the passage, between the turbine blade set and trailing diverging nozzle wherein the turbine unit generates power. This minimises the energy loss created by the backflow pressure created by the turbine blade set.

The present invention provides a turbine assembly adapted to be placed in a flowing fluid, the turbine assembly comprises at least one turbine unit comprising a passage and a turbine blade set located in the passage, the passage incorporating at least one nozzle, wherein the turbine unit is connected to a generator such that movement of each blade set is transformed into electrical energy.

In one aspect, the at least one nozzle may be located such that fluid first passes through the at least nozzle after passing through the turbine blade set, the nozzle being orientated such that the fluid is decelerated as it passes therethrough as well as reducing back flow pressure created by the turbine blade set.

In another aspect the at least one nozzle may be located such that fluid first passes through the at least one nozzle before passing through the turbine blade set, the nozzle being orientated such that the fluid is accelerated as it passes therethrough.

The turbine assembly may comprise a further nozzle wherein the turbine blade set is located between the two nozzles. The nozzle upstream from the turbine blade set may accelerate fluid towards the turbine blade set whilst the nozzle downstream from the turbine blade set slows the fluid down as well as reducing back flow pressure created by the turbine blade set.

In one aspect of the invention the turbine blade assembly comprises a first turbine unit and a second turbine unit, each unit being substantially in abutment such that as fluid passes through the turbine assembly it sequentially passes through the nozzle upstream of the first turbine unit, the turbine blade set of the first turbine unit, the turbine blade set of the second turbine unit before finally passing through the nozzle downstream from the second turbine unit.

The first turbine unit and second turbine unit may be co-axially mounted.

The turbine blade assembly may comprise a third turbine unit. The third turbine unit may be in abutment with the second turbine unit such that fluid exiting the second turbine unit enters the third turbine unit. In one arrangement, fluid exiting the second turbine unit first passes through the nozzle upstream of the third unit before passing through its turbine blade set. In another arrangement fluid exiting the second turbine unit first passes through the turbine blade set of the third unit before passing through the nozzle downstream of the second turbine blade set.

In another aspect of the invention the turbine blade assembly comprises four turbine units a first turbine unit, a second turbine unit, a third turbine unit and a fourth turbine unit, each being arranged in series such that as fluid passes through the turbine assembly it sequentially passes through the nozzle upstream of and adjacent to the first turbine unit, the turbine blade set of the first turbine unit, the turbine blade set of the second turbine unit, the nozzle downstream of and adjacent to the second turbine unit, the nozzle upstream of and adjacent to the third turbine unit, the turbine blade set of the third turbine unit, the turbine blade set of the fourth turbine unit before finally passing through the nozzle downstream of and adjacent to the fourth turbine unit to exit the turbine blade assembly.

One or more of the turbine units may comprise a stator set for directing the fluid onto the blades of the turbine blade set.

Preferably each turbine unit is arranged co-axially. Each turbine unit may be placed a distance from each other.

Each turbine unit may be mounted on an independent shaft. Two or more turbine units may be mounted on the same shaft.

The housing of two or more turbine units may be integral with adjacent units.

There may be multiple turbine units arranged substantially in series with varying orientations and configurations with respect to each other. It is to be understood that these configurations are included in the scope of this invention.

The present invention further provides a turbine assembly comprising at least two turbine units in abutment with each other such that they define a passage, each turbine unit comprises a stator which directs fluid onto a driving turbine blade set before the fluid passes to a pumping turbine blade set wherein the turbine assembly generates power.

Preferably each unit has a gearbox located between the turbine blade sets.

Preferably the section of passage between each unit is substantially straight.

Preferably the turbine assembly has a converging nozzle to accelerate fluid flow as it approaches the first unit.

Preferably the turbine assembly has a diverging nozzle to decelerate fluid flow as it exits the end unit.

The present invention further provides a turbine assembly comprising at least two turbine units in abutment with each other such that they define a passage, each turbine unit comprises a driving turbine blade set before the fluid passes to a pumping turbine blade set wherein the turbine assembly generates power.

Preferably each unit has a gearbox located between the turbine blade sets.

Preferably the section of passage between each unit is substantially straight.

Preferably the turbine assembly has a stator which directs fluid onto the driving turbine blade set fluid flow of the first unit.

Preferably the turbine assembly has a converging nozzle to accelerate fluid flow as it approaches the first unit.

Preferably the turbine assembly has a diverging nozzle to decelerate fluid flow as it exits the third unit.

It is to be understood that fluid flow into and/or out of the turbine assembly may be through multi paths and that this variation is covered by the current invention.

The present invention also provides a turbine assembly comprising:
a first venturi chamber connected to a second venturi chamber to define a passage;
a first turbine blade set positioned in or adjacent to the throat of the first venturi chamber;
a stator located between the first turbine blade set and an opening of the passage;
wherein the second venturi creates a relatively lower pressure region upstream from its throat.

Preferably a second turbine blade set is positioned in or adjacent to the throat of the second venturi chamber whereby the second turbine unit further lowers the pressure upstream therefrom.

BRIEF DESCRIPTION OF THE DRAWINGS

The invention will be better understood by reference to the following description of several embodiments thereof as shown in the accompanying drawings in which:

FIG. 4 provides several detailed views of the turbine blade set according to the first embodiment of the invention, figures A, B, and C illustrate various views of the turbine blade set;

FIG. 8 is a cross sectional schematic view of a turbine assembly according to a third embodiment of the invention;

FIG. 9 is a perspective view of FIG. 8 without the housing.

FIG. 10 is a perspective schematic view of a turbine assembly according to a fourth embodiment of the invention.

BEST MODE(S) FOR CARRYING OUT THE INVENTION

Referring to FIGS. 1 to 6 the invention according to a first embodiment of the invention is in the form of a turbine unit 11. The turbine unit 11 is designed to be located in a fluid flow, and is configured to operate regardless of the direction of flow.

The turbine unit 11 comprises a first turbine blade set 13 and a second turbine blade set 15 coaxially mounted on a shaft 17.

Figure 1:
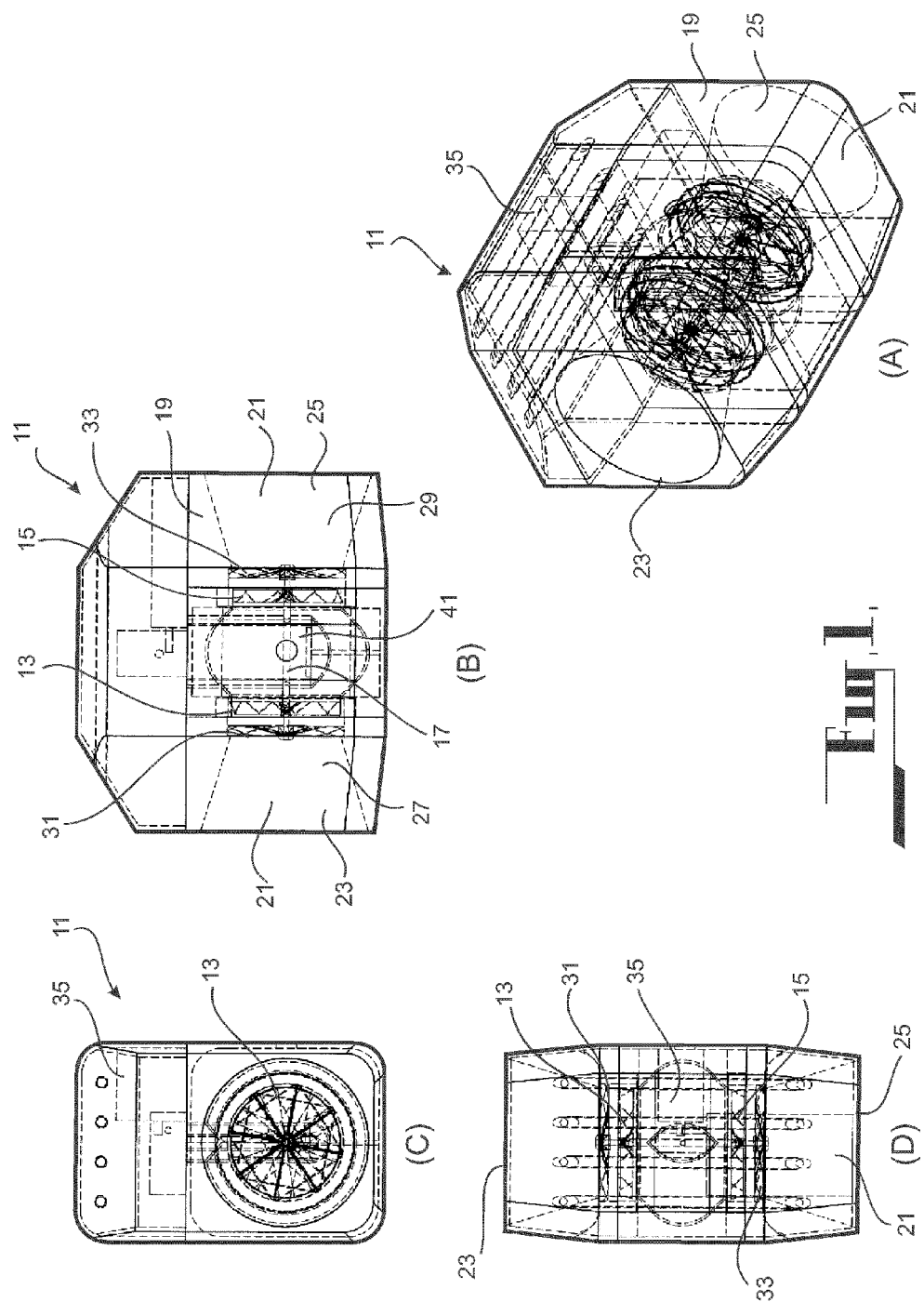
FIG. 1 provides several detailed views of a turbine assembly according to a first embodiment of the invention; figures A, B, C, and D illustrate various views of the assembly.
Figure 2:
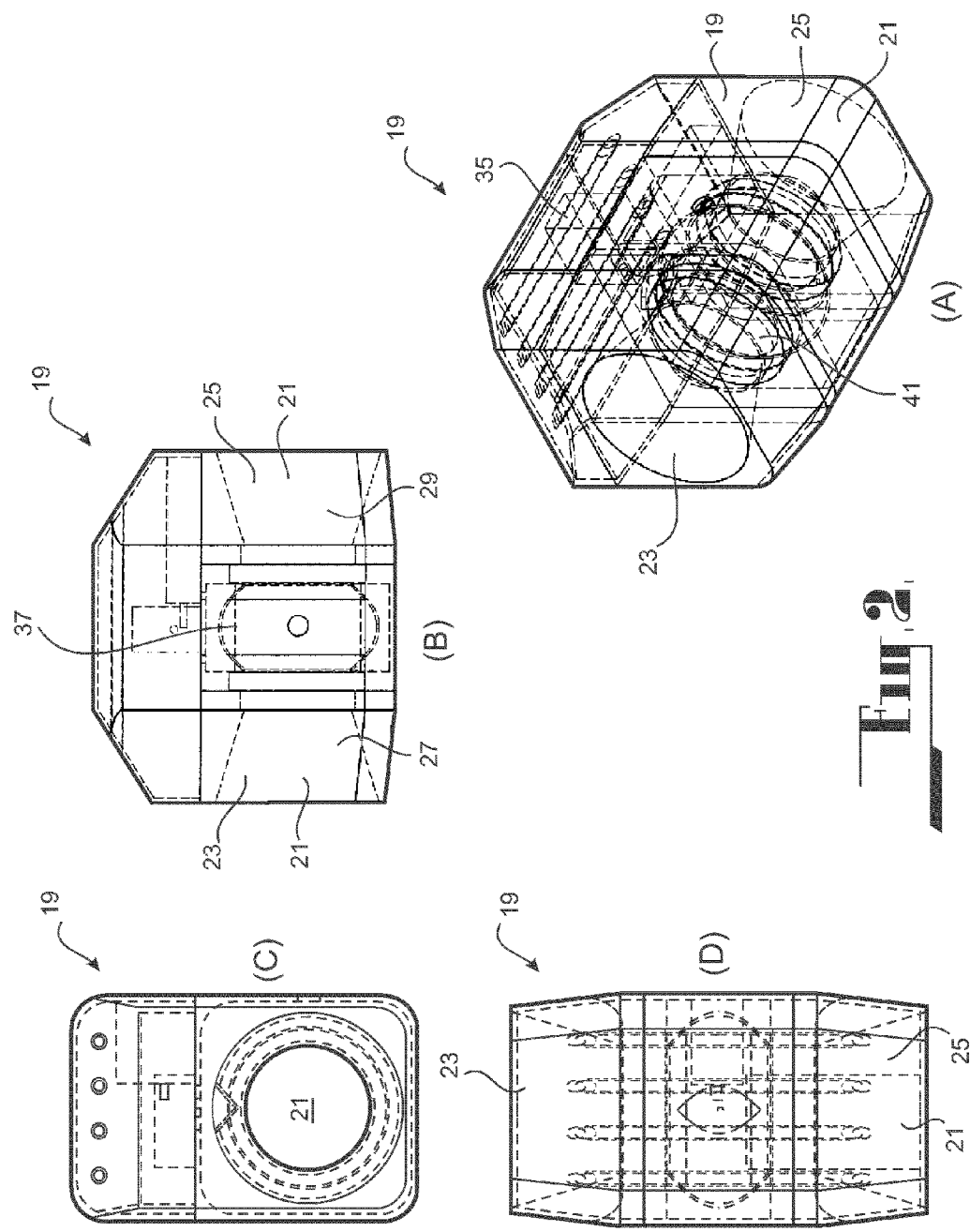
FIG. 2 provides several detailed views of a turbine housing assembled with a generator housing according to the first embodiment of the invention, figures A, B, C, and D illustrate various views of the assembly.
Figure 3:
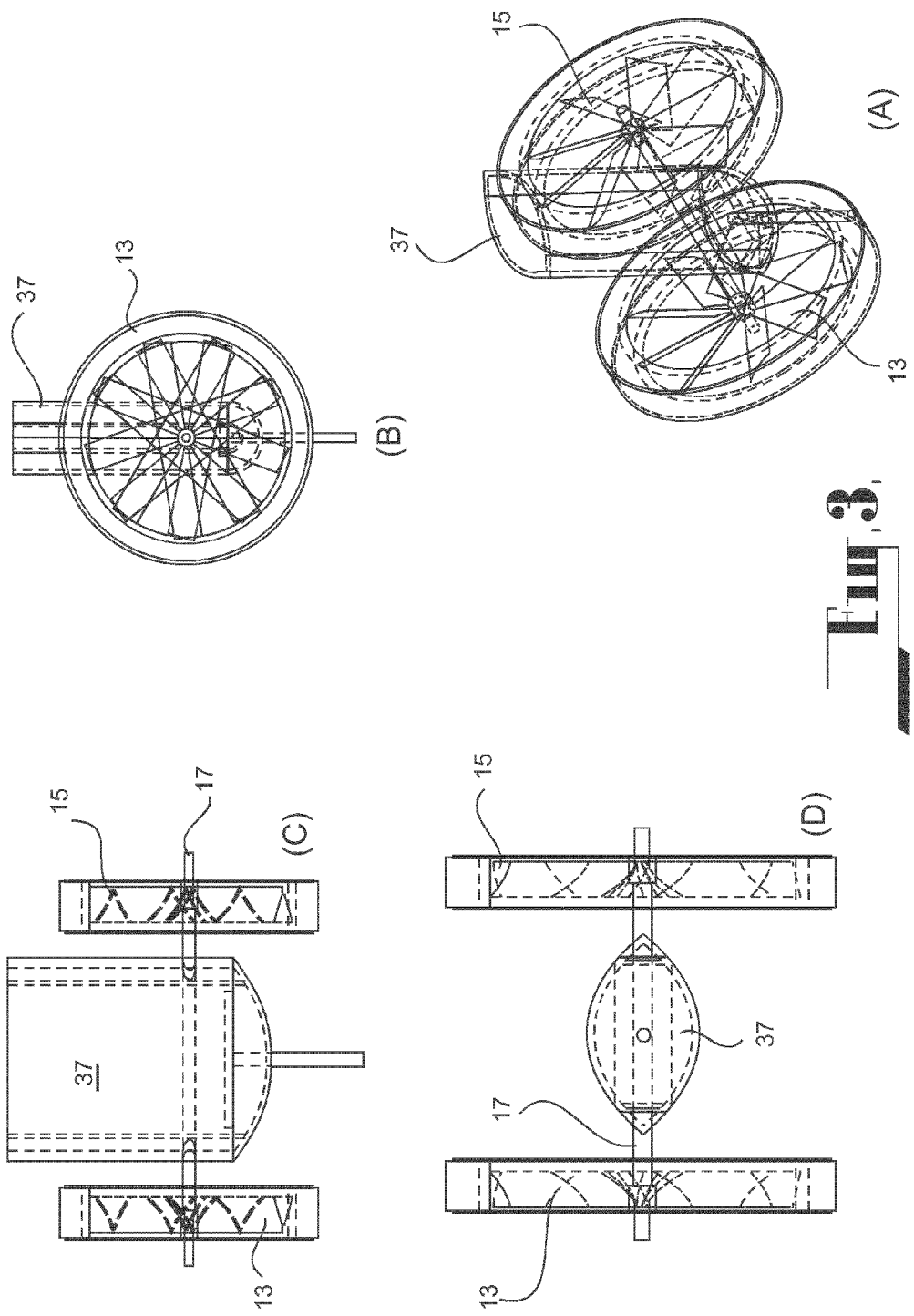
FIG. 3 provides several detailed views of a first turbine blade set and a second turbine blade set connected to a gear box housing according to the first embodiment of the invention, figures A, B, C, and D illustrate various views of the assembly.

The first turbine blade set 13 and second turbine blade set 15 are positioned in a passage 21 formed in a housing 19. The passage 21 channels fluid to the first turbine blade set 13 and second turbine blade set 15. Referring to FIG. 2, the passage 21 has a first end 23 and a second end 25. The passage 21 also incorporates a first nozzle 27 located between the first end 23 and the first turbine blade set 13, and a second nozzle 29 located between the second turbine blade set 15 and the second end 25.

The housing 19 houses a first stator set 31 and a second stator set 33. The first stator set 31 is located in close proximity to the first turbine blade set 13 between the first nozzle 27 and the first turbine blade set 13, whilst the second stator set 33 is located in close proximity to the second turbine blade set 15 between the second nozzle 29 and the second turbine blade set 15.

Each nozzle 27, 29 is configured to converge in a direction towards a chamber 41 which is incorporated in the passage 21 between the first turbine blade set 13 and second turbine blade set 15. That is to say the larger opening of each nozzle 27, 29 is further away from the respective turbine blade set 13, 15 than the smaller opening of the nozzle 27, 29.

Figure 5:
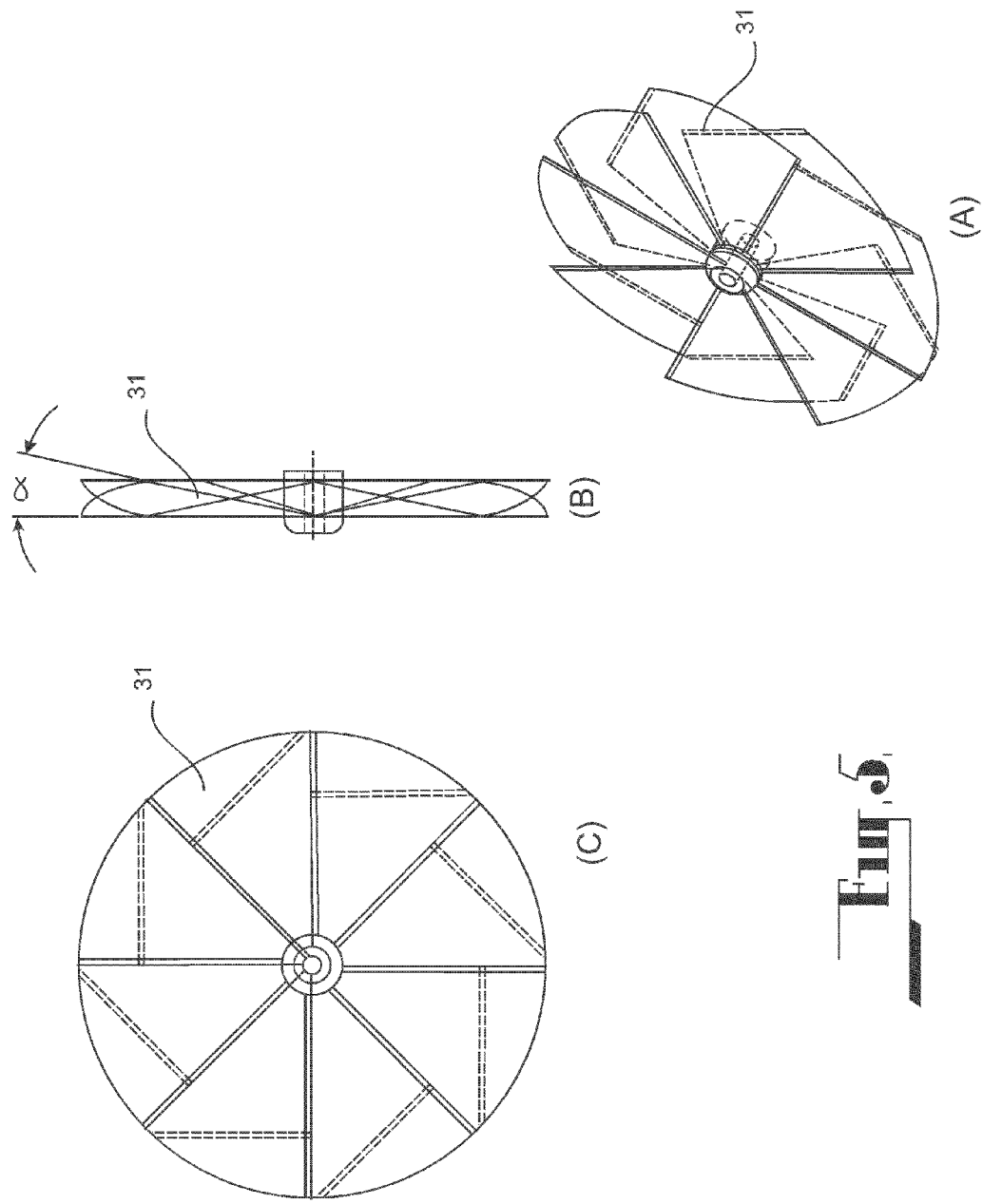
FIG. 5 provides several detailed views of a stator set according to the first embodiment of the invention, figures A, B, and C illustrate various views of the stator set.
Figure 6:
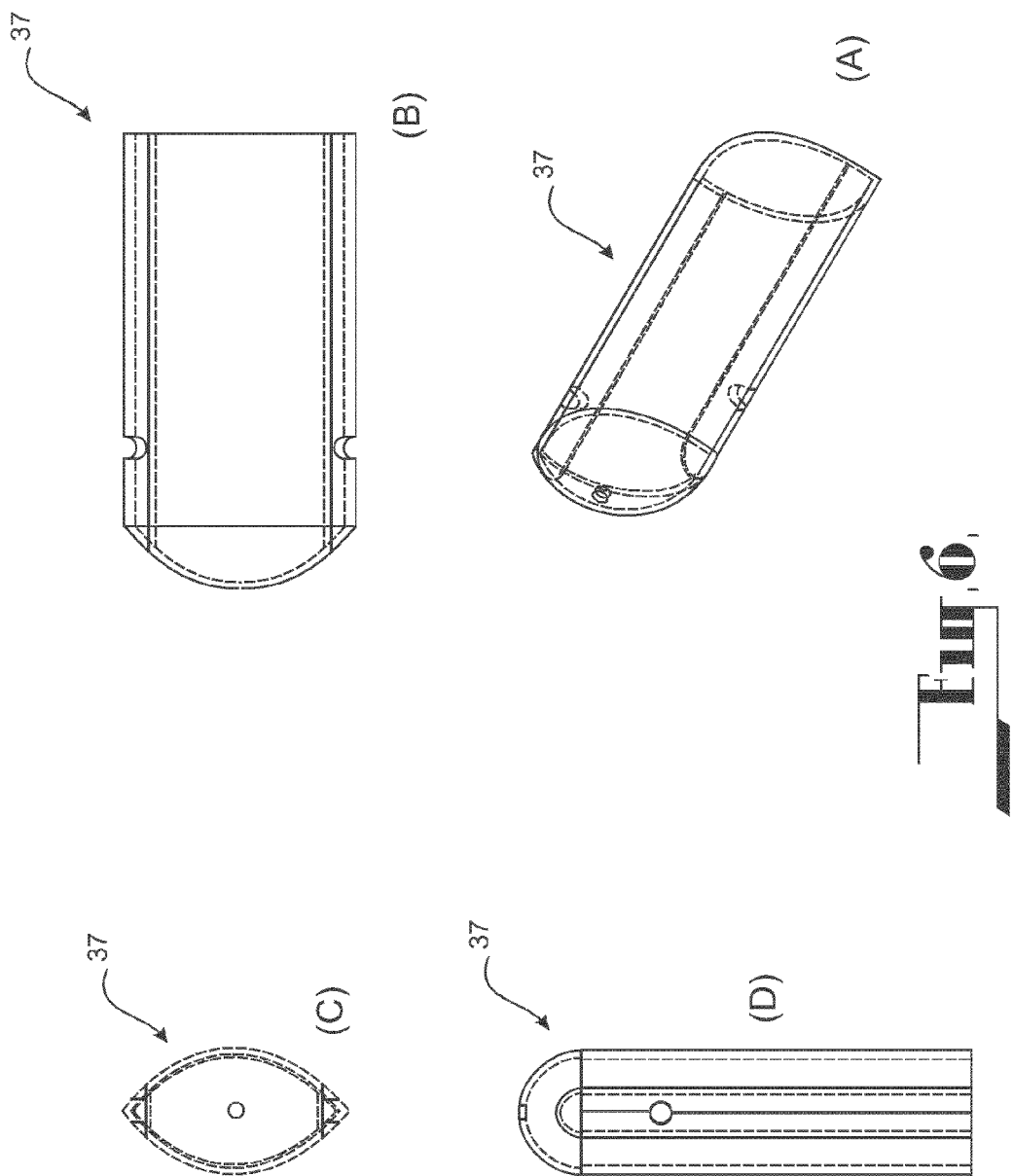
FIG. 6 provides several detailed views of the gear box housing according to the first embodiment of the invention, figures A, B, and C illustrate various views of the gear box housing.

As indicated in FIG. 5, each stator set 31, 33 is adjustable by angle α relative to the shaft 17.

The longitudinal axis of the shaft 17 extends along the longitudinal axis of the passage 21.

The housing 19 further houses a generator 35 connected to the shaft 17 via a gearbox 37.

The gearbox 37 is located within the chamber 41 within the passage 21 and has an external shape such that it assists in directing the flow to the second turbine blade set 15, in addition to minimising energy loose of the fluid as it passes through the chamber 41.

The turbine unit 11 also comprises a control system 39 (not shown). The control system 39 regulates the angle of each stator set 31, 33 so as to achieve the maximum movement of the turbine blade set 13, 15.

In use the fluid passes through the first end 23 of the passage 21 into the first nozzle 27. This nozzle 27 effectively increases the velocity of the fluid before it enters the first stator set 31. The first stator set 31 directs the fluid onto the first blade set 13. This turns the first turbine blade set 13, turning the shaft 17 which passes through the gearbox 37 to turn the generator 39. The generator transforms the mechanical energy into electrical energy, which can be fed directly into a grid or used for other purposes.

As the fluid leaves the first turbine blade set 13 it enters a region of low pressure created by movement of the second turbine blade set 15. The second turbine blade set 15 effectively pulls the fluid away from the first turbine blade set 13 until it passes through the second turbine blade set 15. It then pushes the fluid out the second nozzle 29. The second nozzle 29 also draws the fluid therethrough as it creates a region of relatively low pressure downstream from the second turbine blade set 15. The fluid then passes out the second end 25 of the passage 21.

Whilst the second turbine blade set 15 assists in turning the generator 35 and creating electrical energy it also draws fluid through the system mitigating the effect of backflow pressure losses created by the first turbine blade set 13. This effect also assists in reducing turbulence and increasing fluid velocity.

Obviously when the direction of fluid flow is reversed the mirror image of the assembly dictates that the same output will be achieved by the turbine assembly.

As fluid enters the passage 21 of the turbine unit 11 it is accelerated through the first nozzle 27 towards the first turbine blade set 13. The stator 31 directs the fluid onto the first turbine blade set 13 to ensure maximum conversion of energy. As the first turbine blade set 13 rotates the second turbine blade set 15 also rotates to draw more fluid through the passage 21. This has the effect of creating a low pressure region in the chamber 41 and streamlines the fluid as it passes through the chamber 41. As the blades of the second turbine blade set 15 are reversed to those of the first blade set 13 the fluid is pulled from the first blade set 13 and pushed out of the passage 21. These factors coupled with the low pressure developed by the second nozzle add to inducing the fluid to move through and out of the passage. The velocity of the fluid increases through the system up to the point of entering the second nozzle.

The present invention has been designed to work regardless of the direction of the flow of the fluid. Hence the reverse effect happens when the fluid enters the second nozzle moving towards the second turbine blade set.

Figure 7:
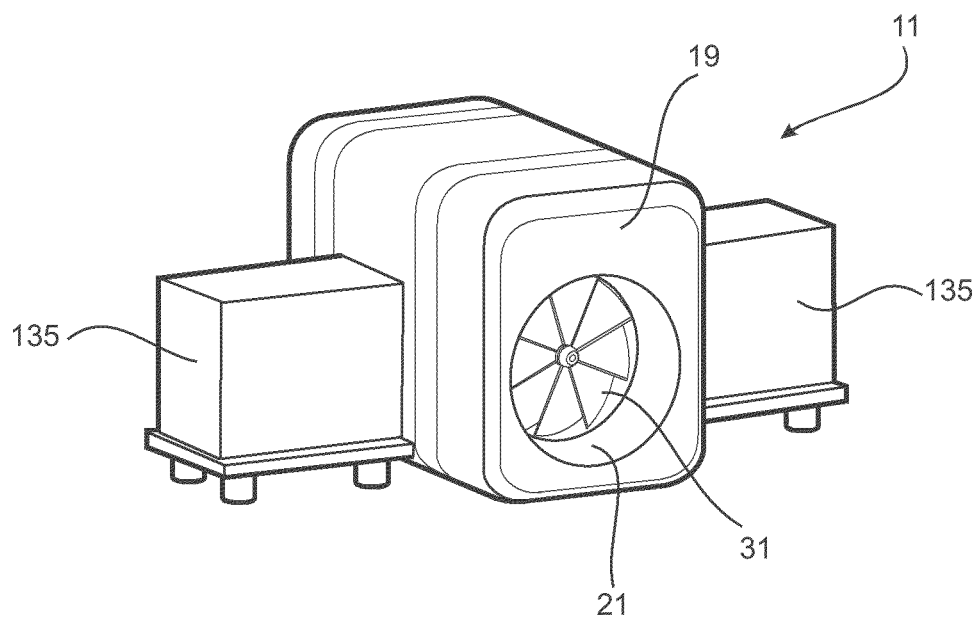
FIG. 7 is a perspective schematic view of a turbine assembly according to a second embodiment of the invention.

Referring to FIG. 7 a second embodiment of the invention is shown. In this embodiment the unit 11 comprises two generators 135 located external to the housing 19 and connected to the turbine blade sets. This application is particularly suited to the large assemblies.

Needless to say there can be multiple generators connected to the housing 19 or even multiple assemblies connected to a generator.

Referring to FIGS. 8 and 9 a third embodiment of the invention is shown. In this embodiment two turbine units 11 as described in the first embodiment are co-axially arranged in series such that fluid exiting a first turbine unit 11*a* immediately enters the second turbine unit 11*b*. In this arrangement the second turbine unit 11*b* effectively draws the fluid through the first turbine unit 11*a*, increasing the velocity of the fluid exiting the first turbine unit 11*a* relative to its velocity before entering the first turbine unit 11*a*. In the figures numbers having an 'a' suffix indicates components of the first unit 11*a*, whilst those having a 'b' suffix indicate the second assembly 11*b*.

Referring to FIG. 10 a fourth embodiment of the invention is shown. This embodiment is particularly suited to those applications in which the fluid is in the form of a gas.

In this embodiment a turbine assembly 101 comprises three turbine units 111 in abutment with each other such that they define a passage 121. Each turbine unit 111 comprises a stator 131 which directs fluid onto a driving turbine blade set 113 before the fluid passes to a pumping turbine blade set 115.

Each unit 111 has a gearbox 137 which is located between the turbine blade sets 113, 115 in a chamber 141.

The passage 131 interconnecting each turbine unit 111 is straight.

The turbine assembly 101 has a converging nozzle 127 to accelerate fluid flow as it approaches the first turbine unit 111*a*. The turbine assembly also has a diverging nozzle 129 to decelerate fluid flow as it exits the end turbine unit 111*c*.

Figure 11:
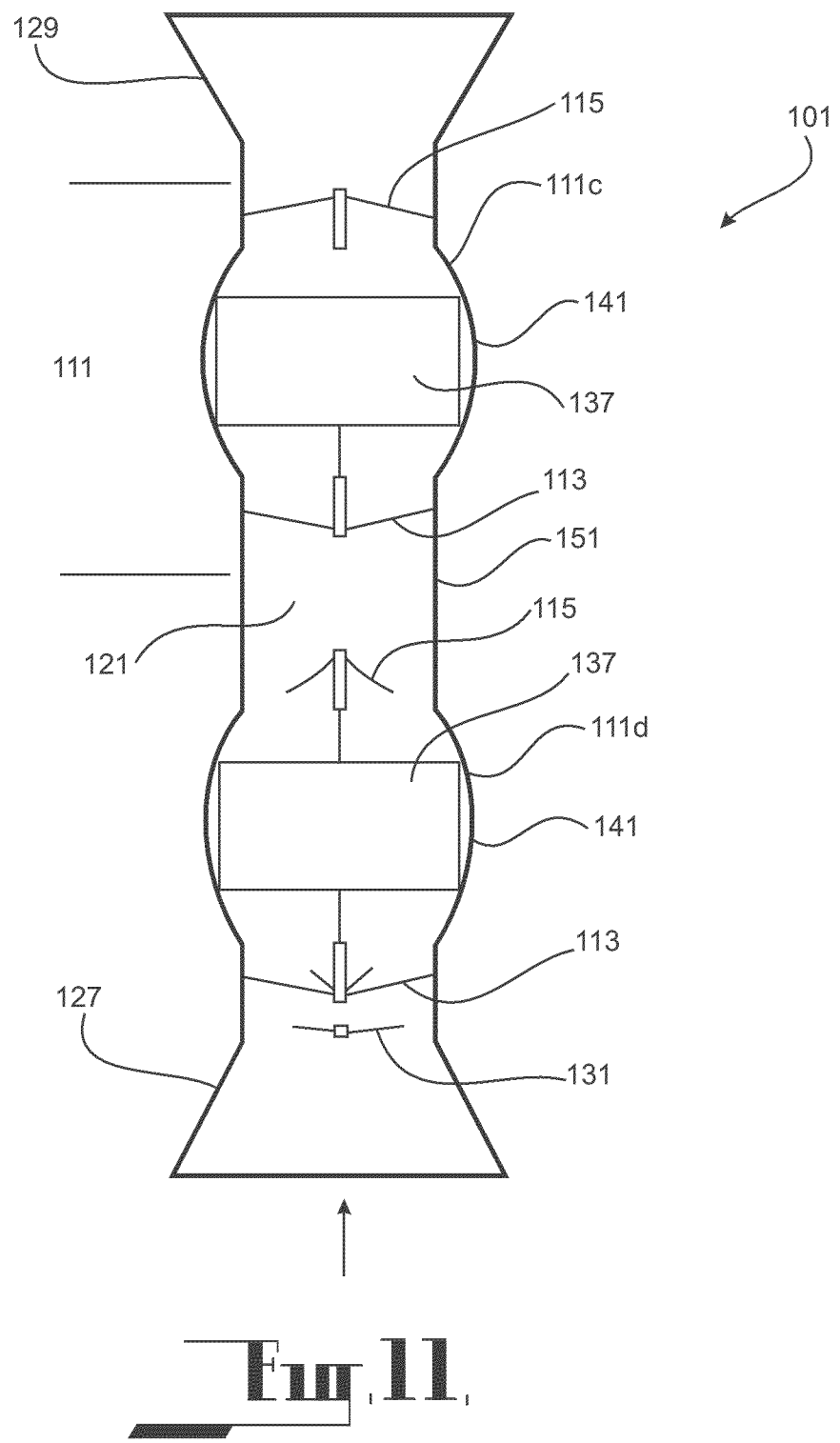
FIG. 11 is a perspective schematic view of a turbine assembly according to a fifth embodiment of the invention.

Referring to FIG. 11 a fifth embodiment of the invention is shown. This embodiment is particularly suited to those applications in which the fluid is in the form of a gas.

In this embodiment a turbine assembly 101 comprises two turbine units 111 in abutment with each other such that they define a passage 121. Each turbine unit 111 comprises a driving turbine blade set 113 and a pumping turbine blade set 115 in spaced apart relation.

Each unit 111 has a gearbox 137 which is located between the turbine blade sets 113, 115 in a chamber 141.

The passage 131 interconnecting each turbine unit 111 is in the form of a straight section.

The turbine assembly 101 has a converging nozzle 127 to accelerate fluid flow as it approaches the first turbine unit 111*a*. The turbine assembly also has a diverging nozzle 129 to decelerate fluid flow as it exits the end turbine unit 111*c*.

The turbine assembly 101 also has a stator 131 located upstream from the first turbine blade set 113 of the first unit 111*d* to direct fluid thereon.

In the fourth and fifth embodiments gas may be feed to the passage by an air duct or a plurality of air ducts and may be located in various locations. For instance, when the turbine assembly 101 is located in a vehicle the air ducts may be in front, underneath, and/or on the side of the vehicle.

Modifications and variations such as would be apparent to the skilled addressee are considered to fall within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A turbine unit adapted to be placed in a flowing fluid, the turbine unit comprises a driving turbine blade set and a pumping turbine blade set mounted within a passage of a housing such that in use the driving turbine blade set is located upstream from the pumping turbine blade set, the driving turbine blade set and pumping turbine blade set are confined to rotate in the same direction such that when the fluid flow rotates the driving turbine blade set, the pumping turbine blade set rotates simultaneously at the same rotational speed, the driving turbine blade set and the pumping turbine blade set are mounted in opposed relation whereby the pumping turbine blade set is in reverse relation to the driving turbine blade set such that in operation a region between the two turbine blade sets has a lower pressure than the fluid pressure at an opening of the passage.

2. The turbine unit according to claim 1 wherein the driving turbine blade set and pumping turbine blade set are in spaced apart relation.

3. The turbine unit according to claim 1 wherein each or both blade set(s) is connected to at least one generator such that movement of each blade set is transformed into power/energy.

4. The turbine unit according claim 3 wherein a gearbox connects the at least one generator to the turbine unit.

5. The turbine unit according to claim 4 wherein the gearbox is interconnected with one or both turbine blade sets.

6. The turbine unit according to claim 1 wherein the driving turbine blade set and pumping turbine blade set are coaxially mounted on a common shaft.

7. The turbine unit according to claim 6 wherein the shaft is connected to a generator such that movement of each blade set is transformed into power/energy 8. The turbine unit according to claim 7 wherein a gear box is connected to the shaft, which in turn is coupled to the generator such that movement of each turbine blade set is transformed by the generator into energy via the gear box.

9. The turbine unit according to claim 1 wherein the axis of rotation of the driving turbine blade set is offset to the axis of rotation of the pumping turbine blade set, whereby the driving turbine blade set and the pumping turbine blade set are interconnected via a gear system.

10. The turbine unit according to claim 1 wherein the passage comprises a chamber located between the driving turbine blade set and pumping turbine blade set.

11. The turbine unit according to claim 10 wherein the chamber extends outwardly from the driving turbine blade set before converging as it approaches the pumping turbine blade set.

12. The turbine unit according to claim 10 wherein the passage comprises a first portion located between a end of the passage and the driving turbine blade set, the first portion being configured to converge in a direction towards the chamber of the turbine unit.

13. The turbine unit according to claim 12 wherein the first portion is in the form of a first nozzle, wherein when the fluid flows such that the first nozzle acts as a diverging nozzle, the nozzle contributes to reducing the back pressure created by the fluid flow energy losses of the turbine blade set as the fluid moves away from the turbine blade set.

14. The turbine unit according to claims 12 wherein the first portion and the section of the chamber adjacent the first portion define a venturi.

15. The turbine unit according to claim 12 wherein the turbine unit comprises a first stator set for directing fluid, the first stator set is located between the first portion and driving turbine blade set, whereby the first stator set directs fluid onto the blades of the driving turbine blade set.

16. The turbine unit according to claim 10 wherein the passage comprises a second portion located between the pumping turbine blade set and a second end of the passage, the second portion being configured to converge in a direction towards the chamber of the turbine unit.

17. The turbine unit according to claim 16 wherein the second portion is in the form of a second nozzle wherein when the fluid flows such that the second nozzle acts as a diverging nozzle, the nozzle contributes to reducing the back pressure created by the fluid flow energy losses of the turbine blade set as the fluid moves away from the turbine blade set.

18. The turbine unit according to claims 16 wherein the second portion and the section of the chamber adjacent the second portion define a second venturi.

19. The turbine unit according to claim 16 wherein the turbine unit comprises a second stator set for directing fluid, the second stator set is located between the second portion and pumping turbine blade set, whereby the second stator set directs fluid on to the blades of the pumping turbine blade set when the flow is reversed.

20. The turbine unit according to claim 10 wherein the gearbox is positioned and the chamber is configured to enhance the venturi effect through the chamber.

21. The turbine unit according to claim 1 wherein the turbine unit comprises a third stator set for directing fluid, the third stator set is located between the driving turbine blade set and pumping turbine blade set, whereby the third stator set directs fluid on to the blades of the pumping turbine blade set as the flow passes from the driving turbine blade set.

22. The turbine unit according to claim 1 wherein the turbine unit comprises a fourth stator set for directing fluid, the fourth stator set is located between the driving turbine blade set and pumping turbine blade set, whereby the fourth stator set directs fluid on to the blades of the driving turbine blade set as the flow passes from the pumping turbine blade set, as would be the case when the flow is reversed.

23. The turbine unit according to claim 22 wherein the first stator set, second stator set, third stator set and/or fourth stator set are coaxially mounted on the shaft.

24. The turbine unit according to claim 1 wherein the blades of each turbine blade set are adjustable.

25. A plurality of turbine units according claim 1 wherein the units are arranged in an array on an ocean bed, riverbed or attached to a structure, such as an oil rig or the hull of a ship.

26. At least one turbine unit according to claim 1 placed in alignment with a hydro slot of a hydroelectric dam, in a pipeline, in a river weir walls, in tidal barrages, dams, water supply lines, or water treatment plants.

27. The turbine unit according to claim 1 wherein the turbine blades of one turbine blade set are a mirror image of the turbine blades of the other turbine blade set when considered from a point between the two turbine blade sets.

28. A turbine unit adapted to be placed in a flowing fluid, the turbine unit comprises a driving turbine blade set and a pumping turbine blade set mounted within a passage in a housing, such that in use the driving turbine blade set is located upstream from the pumping turbine blade set, the driving turbine blade set and pumping turbine blade set are co-axially mounted and are confined to rotate in the same direction such that when the fluid flow rotates the driving turbine blade set, the pumping turbine blade set rotates simultaneously at the same rotational speed, whereby the driving turbine blade set and pumping turbine blade set are spaced apart such that fluid moving in a first direction through the unit will rotate the driving turbine blade set, when fluid moves in a second direction the unit will rotate the pumping turbine blade set wherein the configuration of the turbine blade sets will result in the pumping turbine blade set to act as a driving turbine blade set and the previously driving turbine blade set to act as a pumping turbine blade set, whereby the turbine blade set which trails the other turbine blade set creates a region within the unit of lower pressure relative to a region in front of the turbine blade set upstream from the other turbine blade set.

29. The turbine unit according to claim 28 wherein the turbine blades of one turbine blade set are a mirror image of the turbine blades of the other turbine blade set when considered from a point between the two turbine blade sets.

30. The turbine unit according to claim 28 wherein the driving turbine blade set and pumping turbine blade set are mounted on a common shaft.

31. A turbine unit adapted to be placed in a flowing fluid, the turbine unit comprises a driving turbine blade set and a pumping turbine blade set mounted within a passage of a housing in a spaced apart relation such that in use the driving turbine blade set is upstream from the pumping turbine blade set, the passage comprising a chamber located between the driving turbine blade set and pumping turbine blade set, the driving turbine blade set and pumping turbine blade set are confined to rotate in the same direction such that when the fluid flow rotates the driving turbine blade set, the pumping turbine blade set rotates simultaneously at the same rotational speed, the driving turbine blade set and the pumping turbine blade set are mounted in opposed relation whereby the pumping turbine blade set is in reverse relation to the driving turbine blade set such that in operation a region in the chamber has a lower pressure than the fluid pressure at an opening of the passage.

32. A turbine unit adapted to be placed in a flowing fluid, the turbine unit comprises a driving turbine blade set and a pumping turbine blade set mounted within a passage of a housing such that in use the driving turbine blade set is located upstream from the pumping turbine blade set, the driving turbine blade set and pumping turbine blade set are mounted on a common shaft to be confined to rotate in the same direction such that when the fluid flow rotates the driving turbine blade set, the pumping turbine blade set rotates simultaneously at the same rotational speed, the driving turbine blade set and pumping turbine blade set are mounted in spaced apart relation whereby the pumping turbine blade set is in reverse relation to the driving turbine blade set such that in operation a region between the two turbine blade sets has a lower pressure than the fluid pressure at an opening of the passage.

33. A turbine unit adapted to be placed in a flowing fluid, the turbine unit comprises a driving turbine blade set and a pumping turbine blade set mounted within a passage of a housing in a spaced apart relation, such that in use the driving turbine blade set is located upstream from the pumping turbine blade set, the driving turbine blade set and pumping turbine blade set are confined to simultaneously rotate in the same direction at the same rotational speed, whereby in operation a region upstream from the pumping turbine blade set has a lower pressure than the pressure of the surrounding environment in which the turbine unit operates.

\* \* \* \* \*